March 16, 1971     O. E. STURMAN ET AL     3,570,833
STEP CONTROL
Filed Jan. 15, 1969     2 Sheets-Sheet 1
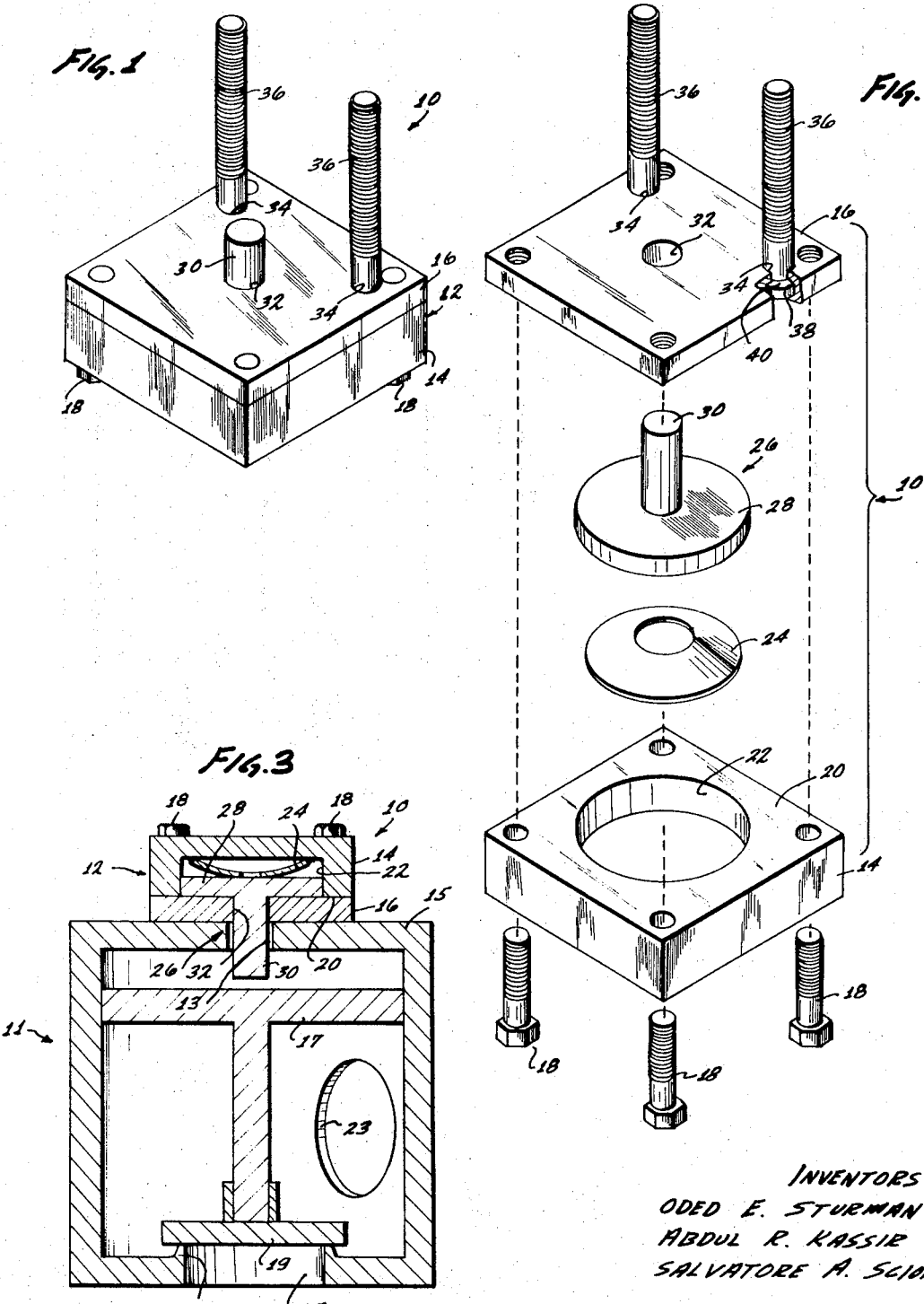
INVENTORS
ODED E. STURMAN
ABDUL R. KASSIR
SALVATORE A. SCIORTINO
BY Nilsson + Robbins
ATTORNEYS

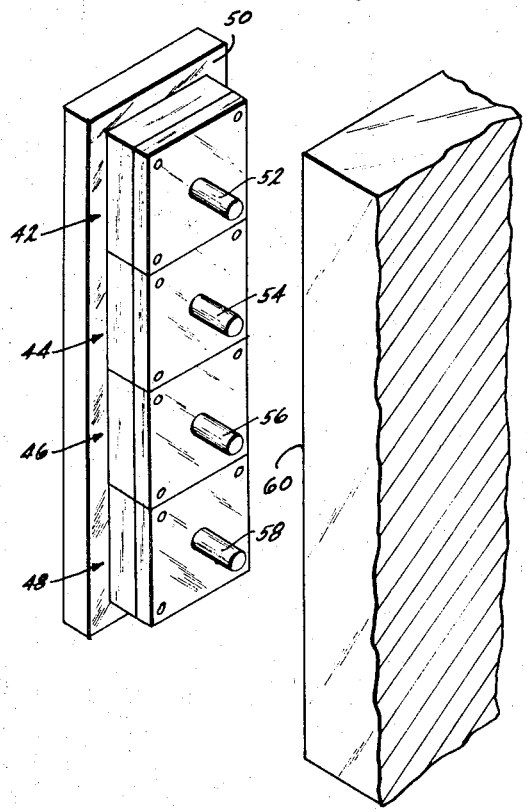
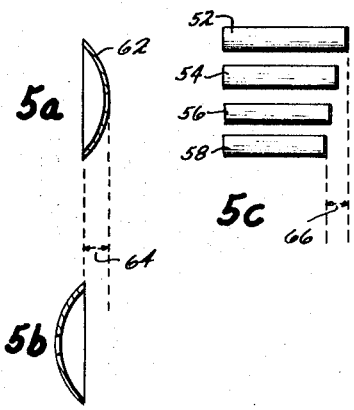
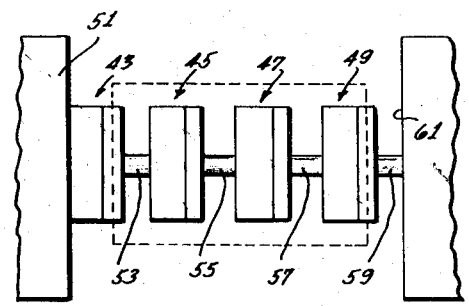
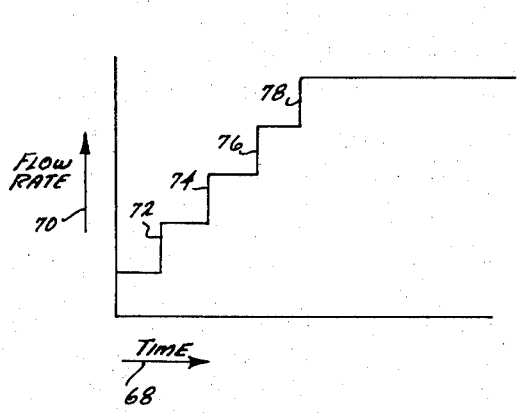

United States Patent Office 3,570,833
Patented Mar. 16, 1971

3,570,833
STEP CONTROL
Oded E. Sturman, Arleta, Salvatore A. Sciortino, North Hollywood, and Abdul R. Kassir, San Gabriel, Calif., assignors to Bell Aerospace Corporation
Filed Jan. 15, 1969, Ser. No. 800,794
Int. Cl. F16f 1/32
U.S. Cl. 267—161                                    8 Claims

ABSTRACT OF THE DISCLOSURE

A step control utilizing a conical washer-shaped member, having a negative spring rate, that is abruptly snapped to a more flattened configuration when subjected to a force in excess of a predetermined magnitude. The control includes means for transmitting force to the conical member and a housing connecting the conical member and transmitting means and defining a reaction surface therefor. The force transmission means extends through an aperture in the housing for reaction with a force-supplying surface. In other embodiments, a plurality of such step controls are disposed in the path of movement of a surface to be controlled for successive abutment with such surface, each step control effecting abrupt release of such control surface, upon application of force thereto in excess of a predetermined magnitude. In still other embodiments, one or more of such step controls are disposed in the path of movement of a valve control to provide step-wise change in the fluid flow rate of the valve.

BACKGROUND OF THE INVENTION (1) Field of the invention

The fields of art to which the invention pertains include the fields of control elements and valve checks and controls.

(2) Description of the prior art

There is a need for a simple and reliable valve control for varying fluid flow rate as a function of time. Present methods attempt to vary flow rate in a step-wise manner by utilizing a separate flow control valve for each flow rate. It would be desirable to accomplish such control utilizing only a single valve. In a broader sense, there is a need for simple, effective and reliable methods for the step-wise and precise control of movement of any surface within narrow ranges, e.g., as a shock absorber for severe acceleration, or to accurately control digital movement of a machine tool or other device.

SUMMARY OF THE INVENTION

The present invention provides a variable flow control for a valve, operable in a plurality of discrete steps to produce a desired flow rate/time characteristic. Only a single valve is required for operation. In its broader aspects, the invention provides a multiple step control for any movable surface. Specifically, one or more mechanical stops are provided which limit the amount of travel of a movable surface or the amount of valve opening. When applied force exceeds the design level the variable mechanical stop snaps away, thereby allowing additional movement. In this manner, additional valve opening can be effected for a higher flow rate.

With respect to electro-mechanical valves, the applied force to open such a valve normally varies with the time required for current to build up in the induction coil, the applied force being primarily a function of the coil current. By utilizing a plurality of snap-away stops, several discrete flow rates as a function of applied force (and, therefore, as a function of time) can be obtained to thereby accomplish a desired flow rate/time characteristic.

Specifically, a step control is provided which incorporates a conical washer-shaped member, e.g., a "Belleville" washer, having a negative spring rate, a reaction surface for the conical member and means transmitting force to the conical member. When force in excess of design is applied to the conical member it abruptly snaps to a more flat or inverted configuration releasing resistance.

BRIEF DESCRIPTION OF THE DRAWINGS

FIG. 1 is a schematic, perspective view of a step control of this invention;

FIG. 2 is an exploded view of the step control of FIG. 1;

FIG. 3 is a schematic, cross-sectional view of a step control disposed in operative association with the poppet of a valve;

FIG. 4 is a schematic, perspective view of a plurality of step controls to be engaged by a moving surface;

FIG. 5 is a diagrammatic representation of the distances travelled by force transmitting portions of the step valve of FIG. 4;

FIG. 6 is a schematic representation of a plurality of step controls disposed in tandem fashion; and FIG. 7 is an illustrative plot of valve flow rate/time obtainable with a multiple stepped control valve of this invention.

DESCRIPTION OF THE PREFERRED EMBODIMENTS

Referring to FIGS. 1 and 2, a single step control 10 is shown having a housing 12 consisting of a rectangularly shaped reaction plate 14 and a mating cover plate 16 secured together by screws 18 in each corner thereof. Referring specifically to FIG. 2, the inside surface 20 of the reaction plate 14 is formed to define a cylindrical pocket 22 in which is placed a "Belleville" washer 24. A stop 26, consisting of a flat circular, disk member 28 and a shaft 30 extending centrally and outwardly therefrom, is disposed atop the "Belleville" washer 24. The stop shaft 30 extends through an aperture 32 therefor in the cover plate 16. The cover plate 16 is also provided with a pair of apertures 34 through which are extended a pair of retaining bolts 36. The inner surface of the cover plate 16 defines pockets 38 at the retaining bolt apertures 34 to accommodate the heads 40 of the bolts 36 so that the bolts 36 can extend from the exterior of the cover plate 16 for securement of the step control 10 while allowing the cover plate 16 and reaction plate 14 to be connected together with their inner surfaces flush. The step control 10 may be constructed without the retaining bolts 36 or such bolts, or the like, may be disposed extending from the reaction plate 14, as may be appropriate to a particular utilization of the step control. The parts are sized so that when the control 10 is assembled with the screws 18 in place, the "Belleville" washer 24 is compressed to near the point of inversion.

The step control 10 of FIGS. 1 and 2 can be disposed on a valve so that the stop shaft 30 is in the path of a movable surface thereof. The movable surface can be an extension of the valve spool, on a slide valve, or the shaft 30 can be disposed to engage the valve poppet.

Referring to FIG. 3, the step control 10 is shown disposed atop a valve 11 with the stop shaft 30 extending through an aperture 13 in the valve housing 15, adjacent a slide member 17 of the valve 11. The slide member 17 extends centrally from a valve poppet 19 that moves therewith in and out of engagement with a poppet seat 21 at the bottom of the housing. An inlet port 23 is defined by the side walls of the valve housing 15 and an outlet port 25 as defined by the poppet seat 21. Torque motor means (not shown) are provided for applying predetermined force on the valve poppet 19 to move the poppet 19 off of its seat 21 to open the valve 11. The valve 11 opens until the slide member 17 rises sufficiently to abut the stop shaft 30 and is stopped thereat. However, when a predetermined force is applied to the stop shaft 30 which exceeds the design force required to invert the "Belleville" washer 24 therein, the washer 24 snaps away, thereby allowing additional valve opening and a higher flow rate.

By utilizing a plurality of step controls, a variable flow control valve can be accomplished which operates in a multiplicity of discrete steps to produce flow rate as a desired function of applied force. The device of FIG. 3 utilizes an induction coil in which time is required to build up coil current. Since the force applied to the valve is primarily a function of coil current, the applied force varies as a function of time. Accordingly, a desired flow rate/time characteristic can be produced. Referring to FIG. 4, a plurality of step controls 42, 44, 46 and 48 are shown secured to a stationary surface 50. Each step control is constructed generally in accordance with the step control depicted in FIGS. 1 and 2 so as to be provided with stop shafts 52, 54, 56 and 58, respectively, extending centrally therefrom. Each stop shaft is operative internally of the step control to abruptly snap a "Belleville" washer therein.

The "Belleville" washers in each case are selected so as to snap at a predetermined force level and the length of the stop shafts 52, 54, 56 and 58 extending exteriorly of the step controls 42, 44, 46 or 48 are chosen so that the least amount of force is required to snap the "Belleville" washer associated with the longest stop shaft. In this manner, the plurality of stop shafts effect the release of a movable surface 60 applied thereagainst in response to progressively increasing force on such surface 60. The movable surface 60 can be an extension portion of a valve spool, or a valve poppet, or the core of a solenoid, or the like.

Referring to FIG. 5, the cross-sectional configuration of a typical "Belleville" washer 62 utilized herein is depicted prior to inversion or snapping thereof (FIG. 5a) and subsequent to inversion (FIG. 5b). It is seen that a predetermined distance is travelled by the stop utilized to snap the "Belleville" washer and this is indicated by a double arrow 64. In FIG. 5c, exterior portions of the stop shafts 52, 54, 56 and 58 are shown aligned for purposes of comparison of their lengths. The difference in lengths between the smallest stop shaft 58 and the largest stop shaft 52 is indicated by the double arrow 66, and is less than the distance of travel 64 of the "Belleville" washer 62 associated with the longest stop shaft 54.

FIG. 6 depicts a plurality of step controls 43, 45, 47 and 49 disposed in tandem fashion with the rearmost control 43 secured to a stationary surface 51. Each step control is generally in accordance with the step control 10 depicted in FIGS. 1 and 2 so as to be provided with stop shafts 53, 55, 57 and 59 extending centrally therefrom. The stop shafts 53, 55, 57 and 59 are equal in length and each is operative internally of the step control to abruptly invert a "Belleville" washer therein. The "Belleville" washer in each case is selected so as to snap at a predetermined force level that increases step-wise from the foremost control 59 to the rearmost control 53. In this manner the plurality of stop shafts effect the release of a movable surface 61 applied thereagainst in response to progressively increasing force on such surface 61.

FIG. 7 depicts a plot of flow rate versus time for the multiple steeping of a valve such as depicted in FIG. 5 or 7. It is seen that during the period of time 68 during which current builds up in the induction coil of the valve, the flow rate 70 increases in four discrete steps 72, 74, 76 and 78, corresponding to the snapping of the "Belleville" washers in the step controls 42, 44, 46 and 48 of the valve arrangement of FIG. 4, or corresponding to the inversion of the "Belleville" washers in the tandem step controls 43, 45, 47 and 49 of the valve arrangement of FIG. 6.

What is claimed is:
1. A multiple step control comprising:
 means movable in a predetermined direction under an applied force; and
 a plurality of means resisting movement of said movable means disposed in the path of said movement for abutment with said movable means, each resisting means effecting abrupt release of said movable means upon the application of said force in excess of predetermined magnitude to thereby provide intermittent movement of said movable means.
2. The control of claim 1, wherein said resisting means are disposed to successively abut said movable means.
3. The control of claim 1, wherein said resisting means are disposed in tandem fashion in said path of movement.
4. The control of claim 1, wherein successive ones of said plurality of resisting means effect said abrupt release in response to progressively increasing force on said movable means to thereby provide step-wise movement of said movable means.
5. The control of claim 1, wherein said resisting means each comprise deformable means having a negative spring rate when subject to said excess of force to thereby effect said release.
6. A step control, comprising:
 a housing having a closed end;
 a conical washer-shaped member received within said housing and having a negative spring rate when subjected to a force in excess of a predetermined magnitude to thereby abruptly assume a more flattened or inverted configuration;
 a reaction surface defined by said closed end of said housing and against which one surface of said washer-shaped member is seated;
 force transmitting means extending through said housing into engagement with another surface of said washer-shaped member; and
 connecting means for attaching said housing adjacent a force supplying surface for engagement between said surface and said force transmitting means.
7. The control of claim 6 wherein said washer-shaped member is compressed between said reaction surface and said force transmitting means to a point near said force of predetermined magnitude.
8. The control of claim 6, wherein said housing defines said reaction surface on one side of said conical member and an aperture on the other side thereof, said force transmitting means comprises a shaft extending through said aperture for reaction with said force-supplying surface.

References Cited
UNITED STATES PATENTS 3,029,071 4/1962 Wells _____ 267—161
3,454,038 7/1969 Katchka et al. _____ 267—159

JAMES B. MARBERT, Primary Examiner

U.S. Cl. X.R.
251—75